US006886951B2

(12) United States Patent
Bennett et al.

(10) Patent No.: US 6,886,951 B2
(45) Date of Patent: May 3, 2005

(54) ACTIVE/ADAPTIVE ACTUATOR DESIGN OF AN ADAPTIVE OPTIC MIRROR

(75) Inventors: Harold Earl Bennett, Ridgecrest, CA (US); Jack D. Westfall, Ridgecrest, CA (US); Robert A. Taylor, Ridgecrest, CA (US); Joseph Jasperson Shaffer, Ridgecrest, CA (US); Earl La Fayette McFadden, Ridgecrest, CA (US)

(73) Assignee: Bennett Optical Research, Inc., Ridgecrest, CA (US)

( * ) Notice: Subject to any disclaimer, the term of this patent is extended or adjusted under 35 U.S.C. 154(b) by 0 days.

(21) Appl. No.: 10/656,775

(22) Filed: Sep. 4, 2003

(65) Prior Publication Data

US 2005/0052761 A1 Mar. 10, 2005

(51) Int. Cl.[7] ................. G02B 7/185; G02B 7/188; H01L 41/053
(52) U.S. Cl. ............... 359/846; 359/849; 310/328
(58) Field of Search ............... 359/846, 847, 359/849; 310/328

(56) References Cited

U.S. PATENT DOCUMENTS

| | | | | | |
|---|---|---|---|---|---|
| 4,295,710 | A | * | 10/1981 | Heinz | 359/849 |
| 4,373,404 | A | * | 2/1983 | Heinz | 74/89.25 |
| 4,408,832 | A | * | 10/1983 | Hartman et al. | 359/846 |
| 5,004,205 | A | * | 4/1991 | Brown et al. | 248/476 |
| 5,037,190 | A | * | 8/1991 | Ealey et al. | 359/845 |
| 5,781,292 | A | * | 7/1998 | Haas et al. | 356/450 |
| 6,219,082 | B1 | * | 4/2001 | Rumsey et al. | 347/242 |
| 2003/0147162 | A1 | * | 8/2003 | Bennett et al. | 359/849 |

FOREIGN PATENT DOCUMENTS

| | | | | |
|---|---|---|---|---|
| DE | 3502024 A1 | * | 7/1986 | ........... G02B/26/08 |
| GB | 2202299 A | * | 9/1988 | ........... F16H/25/24 |

OTHER PUBLICATIONS

H.E. Bennett, et al., "Ground–based adaptive optic transfer mirrors for space applications: I. Design & Materials", Amer. Inst. Phys. Conf. Proc. 664 (1), pp. 582+, May 14, 2003.*

H.E. Bennett, et al., "Ground–based adaptive optic transfer mirrors for space application: II. Composite prototype mirror", Amer. Inst. Phys. Conf. Proc. 664 (1). pp. 593+, May 14, 2003.*

"SSG Space Based Silicon Carbide Optical Systems", SSG Precision Optronics, Inc., presented at NASA Tech Days 2002, (http://optics.nasa.gov/tech_days_2002/docs/30SSGSiCOpticalSystemsinSpace.pdf) May 2002.*

R.E. Aldrich, "Deformable Mirror Wavefront Correctors", Adaptive Optics Engineering Handbook, Ch. 5, R.K. Tyson, editor, Marcel Dekker, Inc. Publ. New York, ©2000.*

* cited by examiner

Primary Examiner—John Juba, Jr.
(74) Attorney, Agent, or Firm—Kenneth G. Pritchard

(57) ABSTRACT

A method and tool to smooth surface contours uses a fixed back plate mounted at a known distance to an actuator holding plate. Each of the actuators is mounted in said actuation holding plate by a support collar threaded into said actuator holding plate. Threaded with said support collar is an actuator holder with rigidly holds an actuator. A differential threaded adjustment device is then inserted through said fixed back plate and connected to say support collar and actuator holder so that each can be moved independently of the other. The actuator is made of two piezoelectric plates connected in parallel and separated by a silicon rubber o-ring.

24 Claims, 3 Drawing Sheets

ACTIVE/ADAPTIVE ACTUATOR DESIGN OF AN ADAPTIVE OPTIC MIRROR

BACKGROUND OF THE INVENTION

Adaptive mirrors permit distorted wave fronts to be reformed into undistorted wave fronts. An example of this problem occurs when a plain wave front from a distant star passes through the earth's atmosphere and is distorted by turbulent layers of air. The heating and cooling of the atmosphere by local weather effects cause these turbulent layers. In general, the further the light travels through the air and the denser the air is, the greater the amplitude of the distortion. Adjusting a mirror surface to match this distortion allows a reflected plain wave front to be observed. The actuator for adjusting the mirror surface to match the wave front distortion must operate very rapidly with response times of one thousandth of a second or less and is called an adaptive actuator. With an adaptive actuator, the adaptive mirrors should perfectly match the distorted wave front laterally and have half the amplitude of the wave front distortion. Another kind of actuator, called an active actuator, corrects for quasistatic surface errors in the mirror. Such errors may arise from inadequate polishing of the mirror, the force of gravity particularly as the mirror is tilted, unequal expansion of the mirror as a result of temperature changes or creep in the mirror surface as a result of internal strains in the mirror. The adaptive mirror should perfectly match these errors.

The phase of the light depends on the wavelength, so the shorter the wavelength the greater the phase error becomes when expressed in fractions of a wavelength.

The actuator correction for these faults does not need to have a rapid response time, but should be capable of being set very accurately. The shorter the wavelength, the greater the phase error and the more critical the required correction.

It is known in the art to use the Fried (freed) coefficient as a statistical measure of the phase error. As the Fried coefficient becomes smaller the distortion becomes greater.

As the light to be refocused moves from the infrared range to the visible range, the adaptive mirror surfaces which needs to be controlled to a fraction of a wavelength becomes subject to even finer tuning.

The stiffness of a composite mirror can be calculated by the structural stiffness module. The manner of this calculation may be found in "Development of Lightweight Mirror Elements for the Euro 50 Mirrors," by Bennett et al. Proceedings of the 2nd Backaskog Workshop on Extremely Large Telescopes, Sep. 11–12, 2003, SPIE (in press).

Many piezoelectric materials are known. They have been made into actuators to move or displace upon application of a predetermined voltage. The voltage causes a piezoelectric substance to expend or contract. For a given voltage a single actuator of piezoelectric material expands in all directions. Anything connected to such a device is displaced or thrown this change in distance. For a given device a set throw range is established. If double the throw distance is needed two identical devices are placed together in electrical series connections or stacked. Applied voltage must be doubled for both actuators to fully respond and give double the throw distance. Lateral movement in such stacks is ignored. Third, fourth and more actuators are added to the stack for greater throw distances.

For audio devices piezoelectric material is coated on a sheet of metal, such as brass, steel, or other desired material creating the equivalent of a bimetallic strip. In this application the lateral expansion causes the device to bow to a given radius of curvature for a preselected voltage and thickness of the metal sheet and piezoelectric coating. In general, the thinner the greater the amount of curvature or bowing. These devices have been used to generate sound waves as the device bows and flattens.

DESCRIPTION OF THE PRIOR ART

Adaptive mirrors have many limitations including thickness of surface. If too thick the result is being unable to match wave fronts having closely spread irregularities. Other limitations are spacing of actuators to deform the surface and inability of actuators to push with enough force to deform the surface to the shape required. These are interrelated problems. In general actuators have their throw distances or displacement range extended by stacking piezoelectric devices in electrical series connections. As the distance desired increases, the voltage increases. Piezoelectric devices are made of metallic plates with a piezoelectric coating and an electrical lead to each so a voltage can be applied to it. A bimetallic effect can be achieved in this manner to cause the device to bow. Applications of this bowing have been limited to audio equipment to produce sound waves.

FIELD OF THE INVENTION

This invention relates to a method and device to adjust the active and adaptive actuator settings for an active or adaptive mirror. In particular this invention relates to a device to adjust for gravity induced distortion and manufacturing irregularities in the polished surface as well as atmospherically induced wave front distortion in the incident light beam. This invention permits active problems to be corrected and also allows adaptive problems to be corrected by distorting the adaptive surface to correct for wave front distortion in an incoming wave front.

This invention further relates to actuators with relatively large throw distances. In particular this invention relates to actuators with short response times and relatively large throw distances at low voltage. This invention also relates to devices that provide tens of micrometers of throw distance without using stacked actuators.

DESCRIPTION OF THE PREFERRED EMBODIMENT

Figure 1:
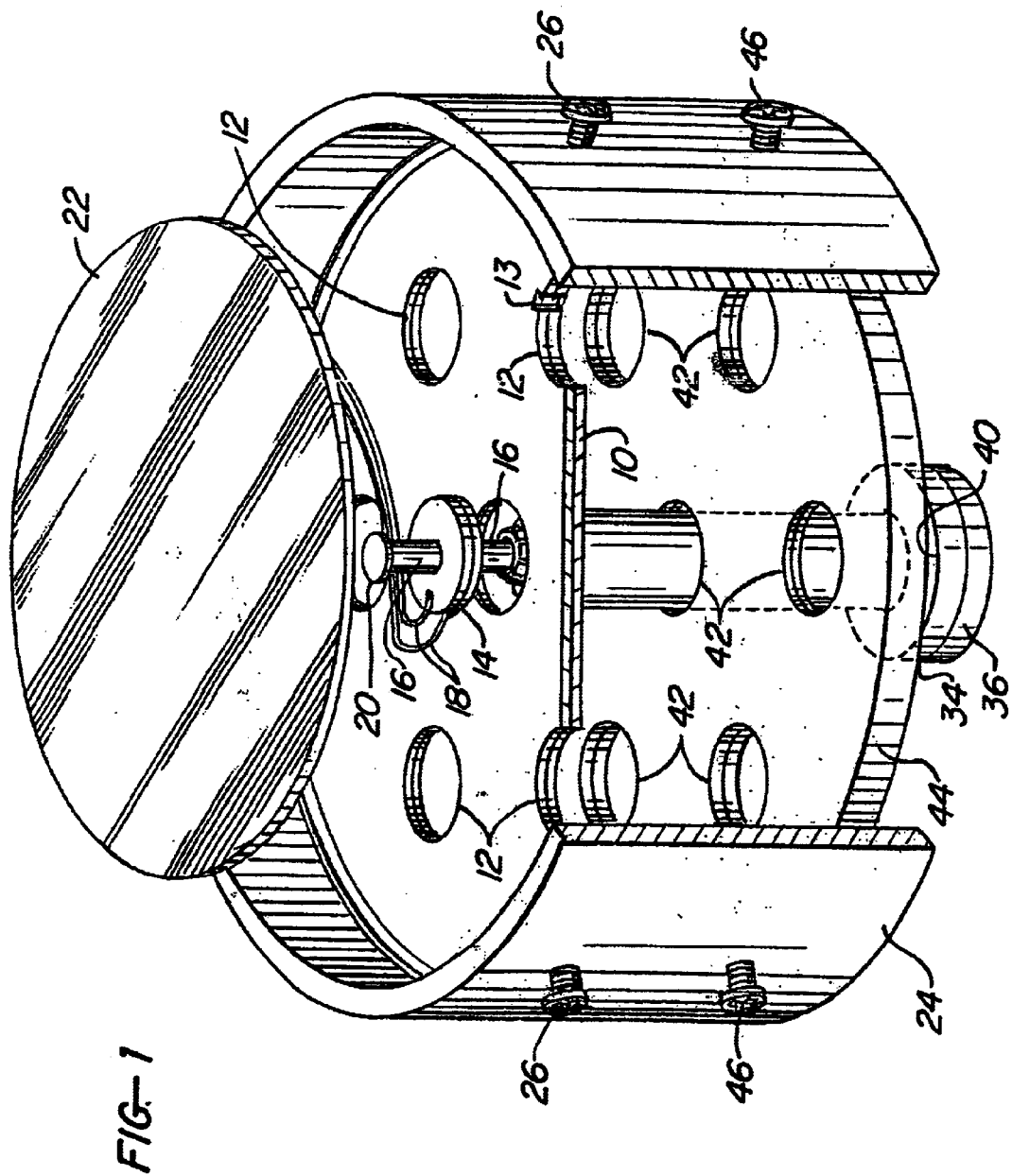
FIG. 1 is cutaway perspective view of the present invention.
Figure 4:
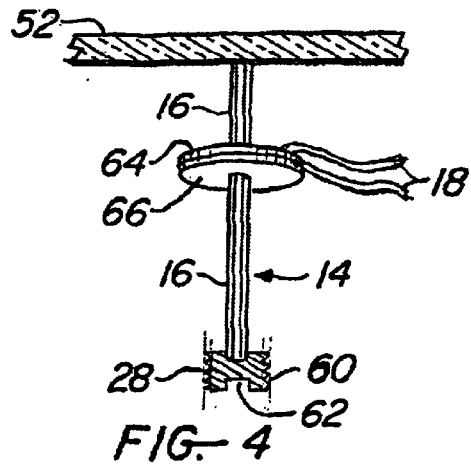
FIG. 4 is a diagram showing the accuracy in displacement control for the active actuator part of the subject of the present invention.

FIG. 1 is a cutaway perspective view of an active actuator plus an adaptive actuator. A holding plate 10 has a plurality of openings 12 as shown. The number of openings 12 is determined as described below. In each opening 12, an actuator 14 is mounted. Each actuator 14 is mounted via a differential thread arrangement described further on. Connected to each actuator 14 is a push-pull rod 16 which is in two pieces for the embodiment shown in FIG. 1. One piece is mounted above actuator 14 and the other is mounted beneath actuator 14. Electrical leads 18 permit electrical signals to be sent to actuator 14 which can be any suitable fast response actuator, such as piezoelectric crystals. Actuator 14 is an adaptive optic actuator that rapidly becomes thicker or thinner as desired. In turn this moves push-pull rods 16 back and forth. Its design is shown in FIG. 4 and will be described further on. One end of the push-pull rod has a mounting 20 which is fastened to the back of an adaptive optic mirror 22. Push-pull rods 16 and mount 20 may be connected to each other by gluing a threaded foot to mount 20 and threading a small screw both into it and into rod 16. Other methods of attachment may be used. In a similar fashion push-pull rods 16 may be glued to actuator 14 and mount 20 is glued to the back side of adaptive mirror 22. The screws keep the actuator function in line with the normal to the object being displaced.

Holding plate 10 is mounted in case 24 shown in a cutaway view. Screws 26 may be used to keep holding plate 10 rigidly mounted. Other methods of attachment may be used as desired. Adaptive mirror 22 may be glued to case 24 or held in place by being attached to mounts 20.

Adaptive mirror 22 has a predetermined coefficient of thermal expansion. To avoid thermal stress to the mirror, case 24 should have the same coefficient of thermal expansion as well as holding plate 10. An example of suitable material is a cyanate ester composite. Another material that appears suitable is a carbon-silicon carbon material available as CSIC on the commercial market.

An actuator may be made of a thin metal sheet coated with a piezoelectric coating. This is a form of bimetallic strip. A bimetallic strip is made of two metals having different expansion coefficients. They are often used to make contact when the temperature in a room changes, for example. By allowing a relatively large area of two thin sheets to bend when the dissimilar expansion coefficients expand one sheet relative to the other one gets a tremendous magnification of motion compared to the motion involved in letting one material expand normal to its surface. For example, in a commercial 6.5" diameter adaptive optic mirror made up of 37 piezoelectric stacks spaced 1.1" apart the sensitivity of each stack was 55 Å/volt displacement. It required 1.5 kV to move the mirror surface by 8 $\mu$m and the bandwidth was DC to 300 Hz. Compare that to the double sandwich described here, where the throw is approximately one $\mu$m/volt and a bandwidth of DC to 2.5 kHz. The high voltages required have always been a problem with piezoelectric actuators and voltage-wise the present invention represents a gain of 1 $\mu$/0.0055 $\mu$m/volt=182 times greater for the present system. Actuator 14 may be made of one or two of these actuators, say 19 millimeter in diameter, each separated by a 1.6 millimeter thick insulating ring, and mounted back to back to maximize throw distance for minimum voltage. Examples of usable actuators are ones with a throw distance of ±30 micrometers at 60 V applied with a reaction time of less than a millisecond. If only one plate is used, the throw distance is reduced by a factor of 2. If a conventional piezoelectric stack is used, typically the reaction time as compared to the two plate actuator 14 is increased from 0.4 msec to 3.3 msec (milliseconds) nearly an order of magnitude.

Figure 2:
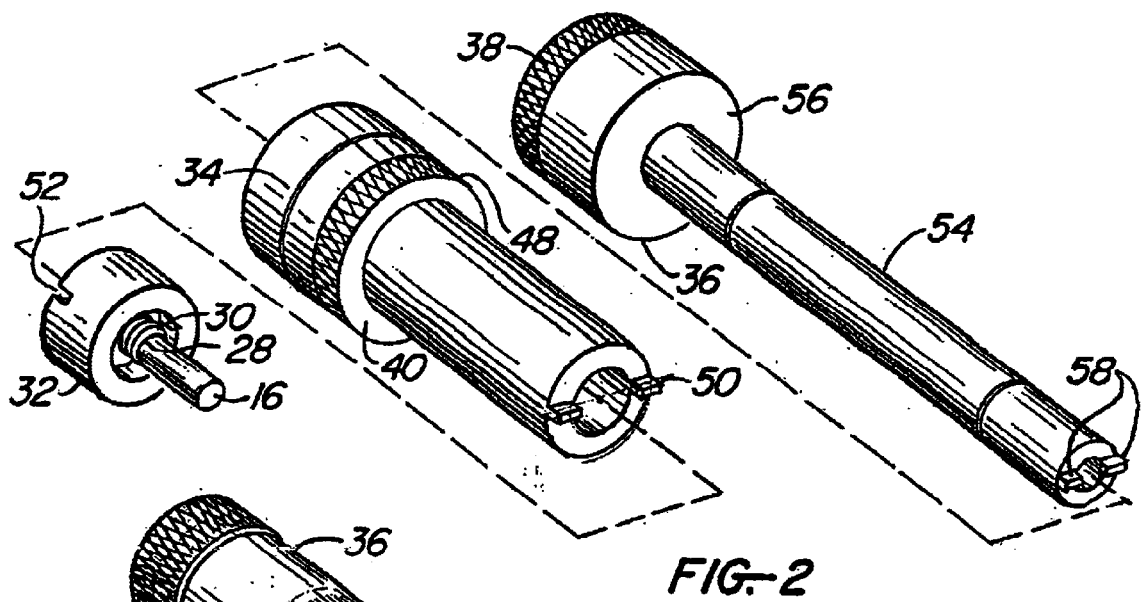
FIG. 2 is an exploded view of the present invention.

FIG. 2 is an exploded view of the setting mechanism. In FIG. 2, push-pull rod 16 is shown mounted in actuator holder 28, which in turn is within differential thread 30 which in turn is within support collar 32. A two-part adjustment handle having coarse handle 34 and fine handle 36 may be made of brass or other metal or equivalent substance. Likewise both may have a knurled surface 38 or a portion thereof as shown. Texturing is not part of the invention but is known as a convenience for such surfaces. Coarse handle 34 is cylindrical and hollow along its intended axis of rotation. Coarse handle 34 has two portions of differing outer diameters so a surface 40 is formed. Surface 40 has the larger of the two outer diameters and is set to be greater than the diameter of openings 42 in calibration mounting plate 44 as shown in FIG. 1. The use of terms coarse and fine is subjective and can be reversed. These two handles serve as a first and as a second adjustment handles.

Referring back to FIG. 1, calibration mounting plate 44 is rigidly mounted in case 24 by screw 46 or any other holding means. A plurality of openings 42 are placed in mounting plate 44 one each which is axially aligned with openings 12 in holding plate 10. Again matching coefficients of thermal expansion is recommended for the material used to make mounting plate 44. Extension 48 is the portion of coarse handle 34 that fits through calibration mounting plate 44 until surface 40 is flush with calibration mounting plate 44. The length of extension 48 is such that it becomes flush to support collar 32 when fully inserted through calibration mounting plate 44. On the end of extension 48 at least one tab 50 is placed which fits notches 52 on support collar 32. In FIG. 2 two tabs 50 are shown. This number may vary. Tabs 50 extend the length of extension 48 and prevent a flush fit unless they fit into matching notches 52 placed in support collar 32. When tabs 50 are inserted into notches 52, support collar 32 may by screwed up and down within holding plate 10 by coarse handle 34. Fine handle 36 has an extension 54 whose outer diameter allows it to fit within the hollow portion of coarse handle 34. Extension 54 has a smaller outer diameter than the rest of fine handle 36, which creates a surface 56, which fits flush to coarse handle 34 when extension is inserted into coarse handle 34. The length of extension is set so it is flush to actuator holder 28 except for a tab which fits into a corresponding notch on the opposite side of actuator holder 28 from the side in contact holding push-pull rod 16. When fine control 36 is turned, extension 54 via tab 58 screws actuator holder 28 back and forth within support collar 32. Support collar 32 may not move because tab 50 of coarse handle 34 do not permit it to turn except when coarse handle 34 is intentionally turned. Likewise, fine control 36 prevents actuator holder 28 from turning when support collar 32 is moved by coarse handle 34. The depth of tabs 50 and 58 set the limit of adjustment distance that actuator 14 can be moved. For micrometer distance adjustments tab depths of millimeters give a reasonable safety range. Because coarse handle 34 and fine handle 36 slide through openings 42 to make a flush fit without attachment, one calibration setting mechanism may be used to set each actuator 14.

Figure 3:
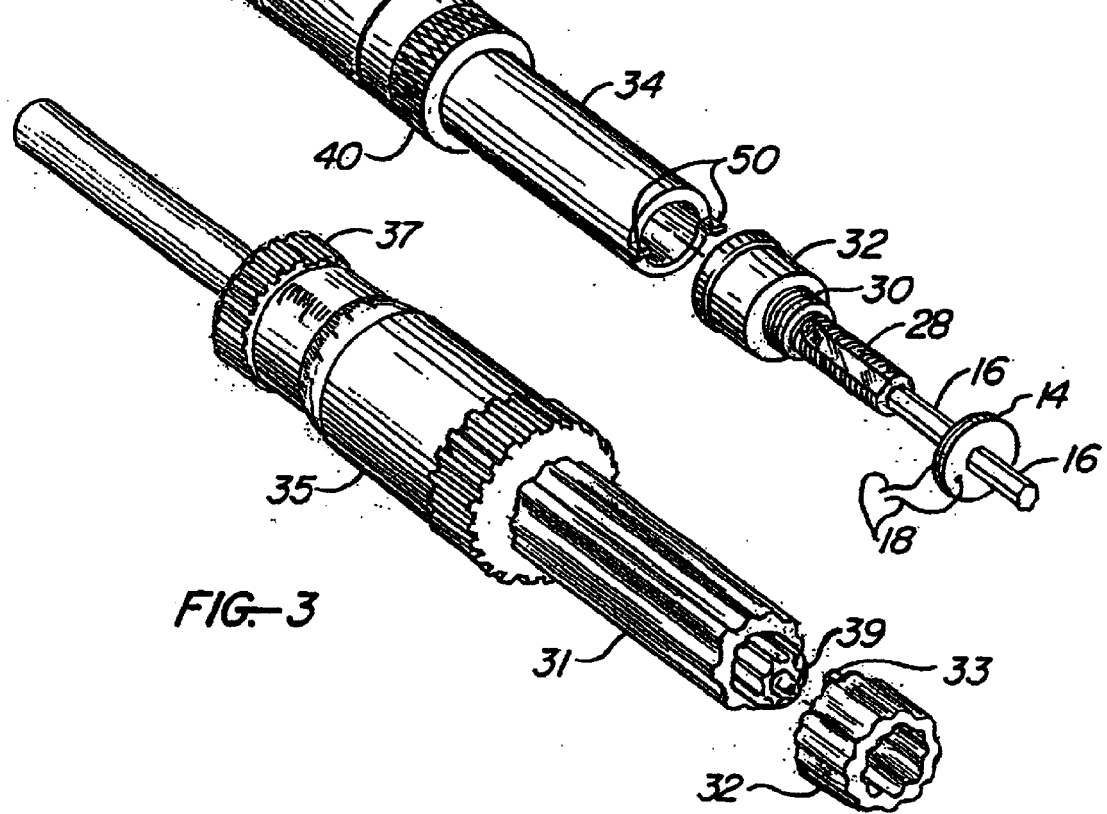
FIG. 3 shows a unique actuator that will work with the present invention.

FIG. 3 shows an assembled view of FIG. 2 and an alternate embodiment if loss of adjustment control is a concern. In Fig. embodiment support collar 32 must be allowed to turn within the opening it is inserted into. If support collar 32 is rigidly fixed in that same opening the technique to adjust may be varied. To fix support collar 32 in a manner so it cannot twist, it may be glued or have a ridge machined onto it to fit a matching slot. Any known method of making a nontwist mount will work. In the prior embodiment, differential thread 30 was moved as support collar 32 was turned. Since support collar 32 is not allowed to turn in this embodiment, for example, a ridge 33 is added to fit a notch 13 as shown in FIG. 1. The effect of ridge 33 within notch 13 is to hold support collar 32 so it cannot turn. Differential thread 31 is rigidly mounted to coarse adjustment handle 35. Within differential thread 31 is threadably inserted fine adjustment handle 37 which includes a threaded end 39 to which is mounted a push-pull rod 16, not shown. This embodiment allows as much distance to adjust as desired. Because it is rigidly mounted to push-pull rod 16 and actuator 14 this calibration mechanism must have one per each actuator and may cause crowded conditions behind mounting plate 44.

FIG. 4 shows an actuator 14 with push-pull rod 16 mounted between actuator holder 28 and adaptive mirror 52.

Push-pull rod 16 may be glued on or otherwise rigidly fixed to both actuator holder 28 and adaptive mirror 52. As shown, actuator holder 28 has threads 60 and a notch 62, which fits tab 58 previously shown.

Figure 6:
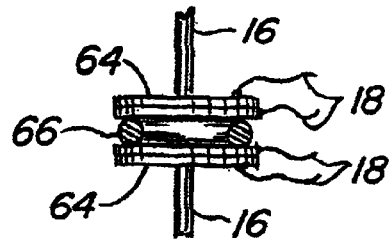
FIG. 6 is a cross section showing the design of the piezoelectric actuator disks to maximize actuator throw.

In the preferred embodiment push-pull rod 16 is split into two segments separated by piezoelectrical plates 64 connected at the edges. As shown two piezoelectrical plates 64 are mounted back to back to a buffer material 66. Piezoelectric plates 64 may be commercially available models such as KBT-33-RB-2CN, KBT-33-RB-2S, KBT-XXRB-2SC/N, or KBS-35DA-3A, all offered by Kyocera. In general a piezoelectric plate is a metal plate such as brass, stainless steel or so formed with a piezoelectric coating. Electrical leads are connected to each in the known fashion. When a voltage is applied to them the piezoelectric plate expands laterally and bows causing the displacement to increase. The displacement resulting from the bowing is much greater than the vertical expansion normal to the plate surface as described above. Also the larger the area of the metal plate that is coated, the more the displacement because a bigger surface is warping. This means that in addition to greater voltages greater areas per actuator can be required. The present invention provided 30 $\mu$m vertical displacement for low voltage of the metal plate, which is about 0.004 inch thick, and the diameter of the plate is no greater than the influence function of the faceplate of the mirror to be adapted. Plates 64 may be glued to material 66 and to push-pull rod 16 segments as shown. Any glue that does not shrink as it dries is appropriate. Glues that shrink will warp the thin optical surface as they dry and are inappropriate for this design. Buffer material 66 ideally may be a silicon rubber ring between plates 58. Use of a rubber ring will work for material 66 with the added advantage of allowing space for plates 58 to bow inward towards each other. Electrical leads 18 are connected to a voltage source as desired to cause plates 58 to expand or contract. A cross section of this preferred embodiment is shown in FIG. 6.

For high quality control of adaptive optic mirrors, the 11 final polished surface may still have a surface contour that effects performance. Such contours can be observed via interference fringes and the local areas that are too high or too low identified. Installation of the mirror surface and connection of the plurality of actuators 14 to the backside of adaptive optic mirror 52 may also induce surface distortions. By systematically inserting the coarse and fine handles through calibration mounting plate 44 each actuator 14 may be screwed in the direction needed to level adaptive optic mirror 52 surface at that location. Once the surface distortion is removed using active optics, the applied voltage to each actuator 14 will, if mirror surface 52 is thin enough to have a short influence function, distort adaptive optic mirror surface 52 in the direction and amount of displacement necessary to correct for an incoming distorted wave front.

Various combinations of threads may be used between coarse control and fine control. To date the best combination of threads has been found to be 1/2-20 SAE and a M8-1.25 metric screw. The matching threads should be as long as possible without binding and the threads themselves as deep as possible to provide maximum contact. An example is to use 1/2-20 SAE threads, which have a half-inch diameter, for this purpose. The thick heavy rod also helps to keep the screws from being bent internally, which introduces a systematic error into the measurements.

Figure 5:
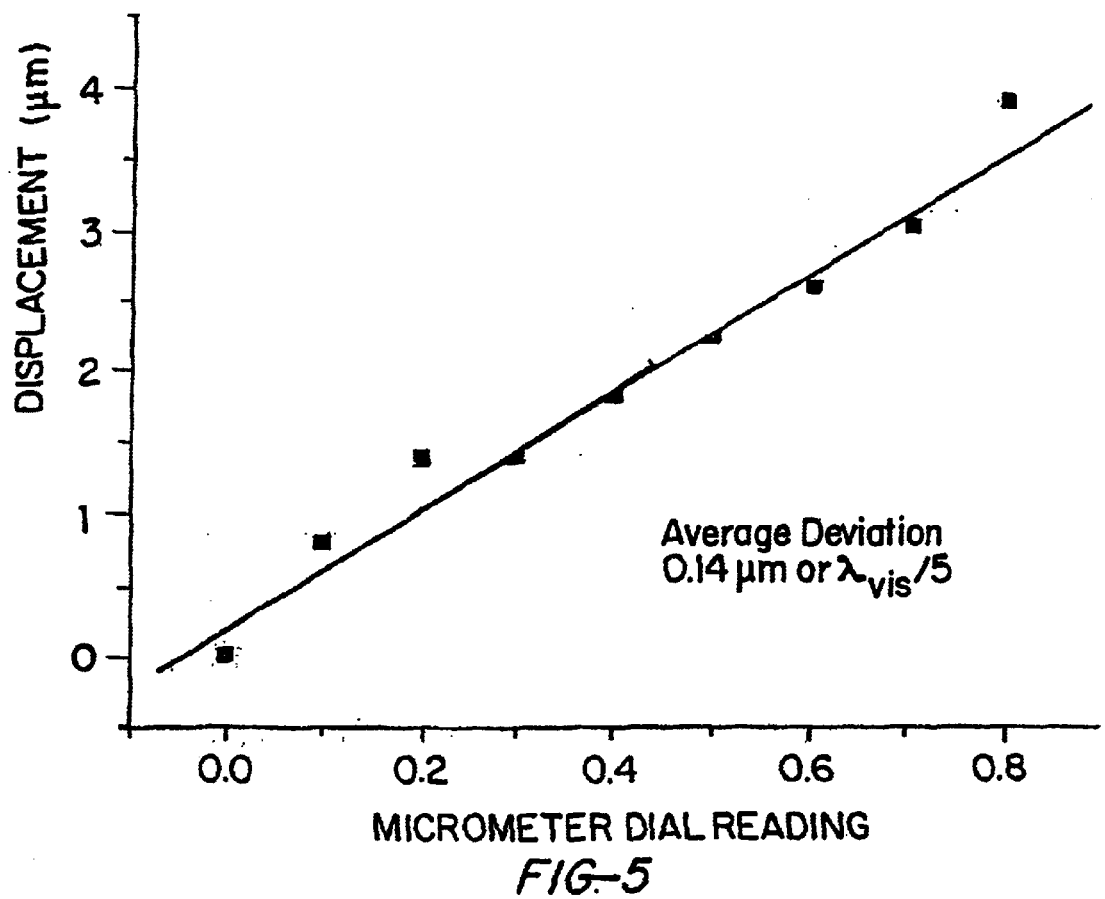
FIG. 5 is a graph of displacement versus micrometer setting for an embodiment of the present invention.

FIG. 5 shows the surface displacement in micrometers, am, for a turn of eight graduation on a fine adjustment micrometer, which has 100 graduations per turn. This data is for the above combination of threads.

FIG. 6 is a cross section of the preferred actuator for the present invention. By having plates 64 in parallel with the piezoelectric layers facing each other and separated, the throw distance is twice the bowing of a single plate. In FIG. 6, each plate 64 is free to bend like a bimetallic strip and much further throw distance is achieved than if only the vertical expansion of the plate has an effect, as in a conventional piezoelectric stack. For the same voltage, the throw distance increases by a factor of 2 compared to that of a single plate and 182 times that achieved per volt for a conventional piezoelectric stack. Throws of 140 $\mu$m have been achieved at higher voltage, but normally 30 $\mu$m is all that is needed for an adaptive optic application. In practice 30 $\mu$m throw distances have been achieved at 30 volts. It is to be noted that the device works with a single plate 64 as the actuator. Use of two electrically in parallel doubles the effect without increasing the voltage. The size of the throw distance depends on the thickness of the actuator materials and the surface area. The thicker the less bending and the greater the surface area the larger the bending. For the application shown, surface area should be comparable to the influence factor of the mirror surface.

What is claimed is:

1. An active/adaptive actuator for an adaptive optic mirror comprising:

A. A case mounted next to said adaptive optic mirror;
   B. a holding plate with a preset plurality of openings rigidly mounted within said case;
   C. a calibration mounting plate rigidly placed in said case such that said holding plate is between said calibration mounting plate and said adaptive optic mirror, said calibration mounting plate having a plurality of openings matching in number those in said holding plate and axially aligned with said openings in said holding plate;
   D. a plurality of support collars, one each mounted in each of said openings in said holding plate;
   E. a plurality of differential threads, one each threaded into each of said support collars;
   F. a plurality of actuator holders one each threaded into each of said differential threads;
   G. a plurality of actuators, one each mounted to each of said actuator holders and operably connected to said adaptive optic mirror;
   H. a first adjustment handle which fits through said openings in said calibration mounting plate such that it operably connects to said support collars, one at a time, so as to turn said support collars; and
   I. a second adjustment handle which is inserted through said first adjustment handle so it operably connects to said differential thread while said first adjustment handle is operable connected to the support collar threaded to said differential thread so as to turn said differential thread independently of turns to said support collar.

2. An active/adaptive actuator for an adaptive optic mirror as described in claim 1 further comprising said case, holding plate, and calibration mounting plate all made of cyanate ester composites with matching coefficients of thermal expansion.

3. An active/adaptive actuator for an adaptive optic mirror as described in claim 2 where said actuators are mounted between two push-pull rods to connect each actuator to its respective actuator holder and to said adaptive optic mirror.

4. An active/adaptive actuator for an adaptive optic mirror as described in claim 3 wherein each of said plurality of actuators comprises two piezoelectric plates electrically connected in parallel and having a silicon rubber o-ring separating them.

5. An active/adaptive actuator for an adaptive optic mirror as described in claim 2 wherein each of said plurality of actuators comprises two piezoelectric plates electrically connected in parallel and having a silicon rubber o-ring separating them.

6. An active/adaptive actuator for an adaptive optic mirror as described in claim 1 where said actuators are mounted between two push-pull rods to connect each actuator to its respective actuator holder and to said adaptive optic mirror.

7. An active/adaptive actuator for an adaptive optic mirror as described in claim 6 wherein each of said plurality of actuators comprises two piezoelectric plates electrically connected in parallel and having a silicon rubber o-ring separating them.

8. An active/adaptive actuator for an adaptive optic mirror as described in claim 1 further comprising said case, holding plate, and calibration mounting plate all made of carbon-silicon-carbon composites with matching coefficients of thermal expansion.

9. An active/adaptive actuator for an adaptive optic mirror as described in claim 8 where said actuators are mounted between two push-pull rods to connect each actuator to its respective actuator holder and to said adaptive optic mirror.

10. An active/adaptive actuator for an adaptive optic mirror as described in claim 9 wherein each of said plurality of actuators comprises two piezoelectric plates electrically connected in parallel and having a silicon rubber o-ring separating them.

11. An active/adaptive actuator for an adaptive optic mirror as described in claim 8 wherein each of said plurality of actuators comprises two piezoelectric plates electrically connected in parallel and having a silicon rubber o-ring separating them.

12. An active/adaptive actuator for an adaptive optic mirror as described in claim 1 wherein each of said plurality of actuators comprises two piezoelectric plates electrically connected in parallel and having a silicon rubber o-ring separating them.

13. An active/adaptive actuator for an adaptive optic mirror comprising:
   A. A case mounted next to said adaptive optic mirror;
   B. a holding plate with a preset plurality of openings rigidly mounted within said case;
   C. a calibration mounting plate rigidly placed in said case such that said holding plate is between said calibration mounting plate and said adaptive optic mirror, said calibration mounting plate having a plurality of openings matching in number those in said holding plate and axially aligned with said openings in said holding plate;
   D. a plurality of support collars, one each rigidly mounted in each of said openings in said holding plate;
   E. a plurality of differential threads, one each threaded into each of said support collars;
   F. a plurality of actuator holders one each threaded into each of said differential threads;
   G. a plurality of actuators, one each mounted to each of said actuator holders and operably connected to said adaptive optic mirror;
   H. a plurality of first adjustment handles, one each connected to said differential threads so said differential thread may be screwed through a rigidly mounted support collar; and
   I. a plurality of second adjustment handles, one each connected to each of said actuator holders such that said actuator holder may be screwed through said differential thread.

14. An active/adaptive actuator for an adaptive optic mirror as described in claim 13 further comprising said case, holding plate, and calibration mounting plate all made of cyanate ester composites with matching coefficients of thermal expansion.

15. An active/adaptive actuator for an adaptive optic mirror as described in claim 14 where said actuators are mounted between two push-pull rods to connect each actuator to its respective actuator holder and to said adaptive optic mirror.

16. An active/adaptive actuator for an adaptive optic mirror as described in claim 15 wherein each of said plurality of actuators comprises two piezoelectric plates electrically connected in parallel and having a silicon rubber o-ring separating them.

17. An active/adaptive actuator for an adaptive optic mirror as described in claim 14 wherein each of said plurality of actuators comprises two piezoelectric plates electrically connected in parallel and having a silicon rubber o-ring separating them.

18. An active/adaptive actuator for an adaptive optic mirror as described in claim 13 where said actuators are mounted between two push-pull rods to connect each actuator to its respective actuator holder and to said adaptive optic mirror.

19. An active/adaptive actuator for an adaptive optic mirror as described in claim 18 wherein each of said plurality of actuators comprises two piezoelectric plates electrically connected in parallel and having a silicon rubber o-ring separating them.

20. An active/adaptive actuator for an adaptive optic mirror as described in claim 13 further comprising said case, holding plate, and calibration mounting plate all made of carbon-silicon-carbon composites with matching coefficients of thermal expansion.

21. An active/adaptive actuator for an adaptive optic mirror as described in claim 20 where said actuators are mounted between two push-pull rods to connect each actuator to its respective actuator holder and to said adaptive optic mirror.

22. An active/adaptive actuator for an adaptive optic mirror as described in claim 21 wherein each of said plurality of actuators comprises two piezoelectric plates electrically connected in parallel and having a silicon rubber o-ring separating them.

23. An active/adaptive actuator for an adaptive optic mirror as described in claim 20 wherein each of said plurality of actuators comprises two piezoelectric plates electrically connected in parallel and having a silicon rubber o-ring separating them.

24. An active/adaptive actuator for an adaptive optic mirror as described in claim 13 wherein each of said plurality of actuators comprises two piezoelectric plates electrically connected in parallel and having a silicon rubber o-ring separating them.

* * * * *